United States Patent
Funkhouser et al.

(10) Patent No.: US 8,309,498 B2
(45) Date of Patent: Nov. 13, 2012

(54) HIGH TEMPERATURE FRACTURING FLUIDS AND METHODS

(75) Inventors: Gary P. Funkhouser, Duncan, OK (US); Rajesh K. Saini, Duncan, OK (US); Arnab Mukherjee, Houston, TX (US)

(73) Assignee: Halliburtn Energy Services, Inc., Duncan, OK (US)

( * ) Notice: Subject to any disclaimer, the term of this patent is extended or adjusted under 35 U.S.C. 154(b) by 331 days.

(21) Appl. No.: 12/566,303

(22) Filed: Sep. 24, 2009

(65) Prior Publication Data

US 2011/0067875 A1 Mar. 24, 2011

(51) Int. Cl.
*C09K 8/588* (2006.01)
(52) U.S. Cl. .................... 507/226; 166/305.1
(58) Field of Classification Search .............. 507/226; 166/305.1
See application file for complete search history.

(56) References Cited

U.S. PATENT DOCUMENTS

| | | |
|---|---|---|
| 4,137,182 A | 1/1979 | Golinkin |
| 4,452,916 A | 6/1984 | Boschetti |
| 5,007,481 A | 4/1991 | Williams et al. |
| 6,586,371 B1 * | 7/2003 | Maroy et al. .................. 507/120 |
| 6,986,391 B2 | 1/2006 | Funkhouser et al. |
| 2004/0211568 A1 * | 10/2004 | Funkhouser et al. ...... 166/308.5 |
| 2005/0039919 A1 * | 2/2005 | Harris et al. ............... 166/308.1 |
| 2006/0269490 A1 * | 11/2006 | Braun et al. .................... 424/59 |

FOREIGN PATENT DOCUMENTS

WO WO2007/059857 A1 5/2007

OTHER PUBLICATIONS

Funkhouser, Gary P.; Synthetic Polymer Fracturing Fluid for High-Temperature Applications; Society of Petroleum Engineers, Inc.; Houston, TX; Feb. 5-7, 2003; pp. 1-6; SPE 80236.

* cited by examiner

*Primary Examiner* — Alicia Toscano
(74) *Attorney, Agent, or Firm* — Robert A. Kent; McDermott Will & Emery LLP

(57) ABSTRACT

Of the many methods and compositions provided by this invention, one method a method of treating a subterranean formation, comprising: providing a treatment fluid comprising: an aqueous base fluid and a reaction product of a gelling agent comprising a copolymer or salt thereof comprising N-[tris(hydroxymethyl)methyl]acrylamide, 2-acrylamido-2-methylpropanesulfonic acid or a salt thereof, and acrylamide; and a crosslinking agent; and introducing the treatment fluid into a subterranean formation.

18 Claims, 1 Drawing Sheet

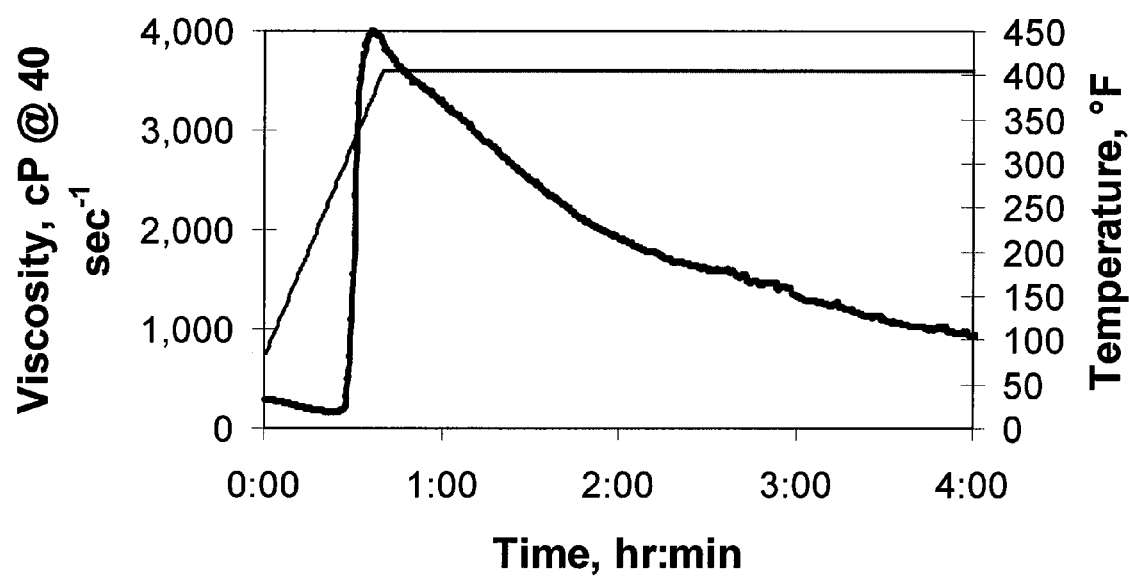

HIGH TEMPERATURE FRACTURING FLUIDS AND METHODS

BACKGROUND

The present invention relates to methods and compositions for treating subterranean formations. More particularly, the present invention relates to treatment fluids comprising gelling agents and crosslinking agents, and methods of using these treatment fluids in high-temperature fracturing operations.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. After at least one fracture is created and the proppant particulates are substantially in place, the fracturing fluid may be "broken" (i.e., the viscosity of the fluid is reduced), and the fracturing fluid may be recovered from the formation.

Treatment fluids are also utilized in sand control treatments, such as gravel packing. In gravel-packing treatments, a treatment fluid suspends particulates (commonly referred to as "gravel particulates") to be deposited in a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid may be reduced to allow it to be recovered. In some situations, fracturing and gravel-packing treatments are combined into a single treatment (commonly referred to as "frac pack" operations). In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in these treatment fluids can be important for a number of reasons. For example, maintaining sufficient viscosity is a primary concern for particulate transport and/or to create or enhance fracture width. Also, maintaining sufficient viscosity may be important to control and/or reduce fluid-loss into the formation. At the same time, it may also be desirable to maintain the viscosity of the treatment fluid in such a way that the viscosity also may be easily reduced at a particular time, inter alia, for subsequent recovery of the fluid from the formation.

To provide the desired viscosity, polymeric gelling agents commonly are added to the treatment fluids to form viscosified treatment fluids. The term "gelling agent" is defined herein to include any substance that is capable of increasing the viscosity of a fluid, for example, by forming a gel. Examples of commonly used polymeric gelling agents include, but are not limited to, guar gums and derivatives thereof, cellulose derivatives, biopolymers, and the like. To further increase the viscosity of a viscosified treatment fluid, often the gelling agent is crosslinked with the use of a crosslinking agent. Conventional crosslinking agents usually comprise a metal ion that interacts with at least two gelling agent molecules to form a crosslink between them, thereby forming a "crosslinked gelling agent." In some instances, treatment fluids comprising crosslinked gelling agents also may exhibit elastic or viscoelastic properties, wherein the crosslinks between gelling agent molecules may be broken and reformed, allowing the viscosity of the fluid to vary with certain conditions such as temperature, pH, and the like.

In high temperature applications, however, some viscosified treatment fluids may degrade and lose viscosity, especially those that are aqueous-based and comprise biopolymer-based gelling agents. Accordingly, various viscosity-increasing synthetic polymers have been developed for use in aqueous treatment fluids to achieve high viscosity and subsequently broken. While such synthetic polymers have achieved some success, crosslinking these fluids may be problematic. For example, in some instances, the gelling agent may "over-crosslink" in the presence of high concentrations of crosslinking agent, yielding a treatment fluid that is over-viscosified, difficult to break, exhibits syneresis (i.e., separation of liquid in a gel), or has other undesirable rheological properties. In addition, in some instances, the gelling agent may crosslink too rapidly, often before introduction into the subterranean formation, resulting in high friction pressure and gel shear degradation inside the tubing used to introduce the treatment fluid into the subterranean formation.

SUMMARY

The present invention relates to methods and compositions for treating subterranean formations. More particularly, the present invention relates to treatment fluids comprising gelling agents and crosslinking agents, and methods of using these treatment fluids in high-temperature fracturing operations.

In one embodiment, the present invention provides a method of treating a subterranean formation, comprising: providing a treatment fluid comprising: an aqueous base fluid and a reaction product of a gelling agent comprising a copolymer or salt thereof comprising N-[tris(hydroxymethyl)methyl]acrylamide, 2-acrylamido-2-methylpropanesulfonic acid or a salt thereof, and acrylamide; and a crosslinking agent; and introducing the treatment fluid into a subterranean formation.

In one embodiment, the present invention provides a method of fracturing a subterranean formation, comprising:

providing a treatment fluid comprising: an aqueous base fluid and a reaction product of a gelling agent comprising a copolymer or salt thereof comprising N-[tris(hydroxymethyl)methyl]acrylamide, 2-acrylamido-2-methylpropanesulfonic acid or a salt thereof and acrylamide; and a crosslinking agent; and introducing the treatment fluid into a subterranean formation at a pressure sufficient to create or enhance at least one fracture within the subterranean formation. In one embodiment, the present invention provides a treatment fluid comprising: an aqueous base fluid; a gelling agent comprising a copolymer or salt thereof comprising N-tris[(hydroxymethyl)methyl]acrylamide, 2-acrylamido-2-methylpropanesulfonic acid or a salt thereof and acrylamide; and a crosslinking agent. The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention and should not be used to limit or define the invention.

FIG. 1 illustrates the viscous properties of a treatment fluid in accordance with a particular embodiment of the present invention.

While the present invention is susceptible to various modifications and alternative forms, specific embodiments thereof have been shown by way of example in the figures and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims

DESCRIPTION OF PREFERRED EMBODIMENTS

The present invention relates to methods and compositions for treating subterranean formations. More particularly, the present invention relates to treatment fluids comprising gelling agents and crosslinking agents, and methods of using these treatment fluids in high-temperature fracturing operations.

One of the advantages of some embodiments of the present invention, many of which are not discussed herein, is the ability to treat subterranean formations having temperatures as high as 400° F. without the treatment fluids becoming substantially unstable. Another potential advantage associated with some embodiments of the present invention may include the ability to use lower concentrations of gelling agents in the treatment fluids to maintain the treatment fluid properties and performance. Such lowered concentrations of gelling agents may ease the clean-up process once the subterranean treatment is completed. Yet another potential advantage of some embodiments of the present invention may include the ability to achieve higher stability of the treatment fluid at high temperatures by making use of a dual crosslinking mechanism. Other advantages may be evident to one skilled in the art.

Before the crosslinking reaction occurs, the treatment fluids of the present invention may comprise an aqueous base fluid; a gelling agent comprising a copolymer or salt of N-[tris(hydroxymethyl)methyl]acrylamide, 2-acrylamido-2-methylpropane sulfonic acid or its salts, acrylamide, and optionally acrylic acid or a salt thereof, and a crosslinking agent.

After the crosslinking reaction occurs, a treatment fluid in accordance with the present invention may comprise an aqueous base fluid and a reaction product of a gelling agent comprising a copolymer or salt of N-[tris(hydroxymethyl)methyl] acrylamide, 2-acrylamido-2-methylpropane sulfonic acid or its salts, acrylamide, and optionally acrylic acid or a salt thereof, and a crosslinking agent. In some embodiments, the crosslinking agent comprises at least one component that comprises a zirconium or titanium metal ion.

Generally, the aqueous base fluids used in the treatment fluids of the present invention may comprise fresh water, saltwater (e.g., water containing one or more salts dissolved therein), brine (e.g., saturated saltwater), seawater, or combinations thereof, and may be from any source, provided that they do not contain components that might adversely affect the stability and/or performance of the treatment fluids of the present invention. In some embodiments, the density of the aqueous base fluid may be increased, among other purposes, to provide additional particle transport and suspension in the treatment fluids of the present invention. Additionally, in some embodiments, the pH of the aqueous base fluid may be adjusted (e.g., by a buffer or other pH adjusting agent), among other purposes, to facilitate hydration of the gelling agent, activate a crosslinking agent, and/or reduce the viscosity of the treatment fluid (e.g., activate a breaker, deactivate a crosslinking agent). In these embodiments, the pH may be adjusted to a specific level, which may depend on, among other factors, the type of gelling agent, type of crosslinking agent, and/or type of gel breaker (if present) included in the treatment fluid. With the benefit of this disclosure, one of ordinary skill in the art will recognize when such density and/or pH adjustments are appropriate.

In some embodiments, the treatment fluids suitable for use in the present invention may be foamed (e.g., a liquid that comprises a gas such as nitrogen or carbon dioxide). As used herein, the term "foamed" also refers to commingled fluids. In certain embodiments, it may desirable that the treatment fluid is foamed to, inter alia, reduce the amount of fluid that is required, e.g. in water sensitive subterranean formations, to reduce fluid loss to the subterranean formation, enhance flow back of fluids, and/or to provide enhanced proppant suspension. While various gases can be utilized for foaming the treatment fluids of this invention, nitrogen, carbon dioxide, and mixtures thereof are preferred. In examples of such embodiments, the gas may be present in a treatment fluid of the present invention in an amount in the range of about 5% to about 98% by volume of the treatment fluid, and more preferably in the range of about 20% to about 80%. The amount of gas to incorporate into the fluid may be affected by factors including the viscosity of the fluid and wellhead pressures involved in a particular application. One of ordinary skill in the art with the benefit of this disclosure would be able to select an appropriate amount of gas to incorporate into the treatment fluid based on the application in which the treatment fluid would be used.

Treatment fluids of the present invention also comprise a gelling agent that comprises a copolymer or salt of N-[tris(hydroxymethyl)methyl]acrylamide, 2-acrylamido-2-methylpropane sulfonic acid (hereinafter referred to as "AMPS®") or its salts, acrylamide, and acrylic acid or salts thereof. As used herein, the term "copolymer" refers to a polymer that results from the copolymerization of at least two discrete monomers, while the term "polymer" refers to a chemical compound formed by polymerization and consisting essentially of repeating structural units. The copolymer of N-[tris(hydroxymethyl)methyl]acrylamide, AMPS®, acrylamide, and optionally acrylic acid or salts thereof is believed to hydrate in the presence of water to form a gel that can be rapidly crosslinked by metal ions through a dual crosslinking mechanism. Generally, the AMPS® (or salts thereof) is present in the copolymer in an amount in the range of about 15 weight % to about 80 weight %, the acrylamide is present therein in an amount in the range of about 10 weight % to about 50 weight %, the N-[tris(hydroxymethyl)methyl]acrylamide is present therein in an amount in the range of about 0.1 weight % to about 10 weight %, and the acrylic acid (or salts thereof) is present therein in an amount in the range of about 0 weight % to about 10 weight %.

Generally, the gelling agent is present in the treatment fluids of the present invention in an amount sufficient to provide the desired viscosity. For example, the gelling agent may be present in the treatment fluid in an amount in the range of about 0.05% to about 2% weight/volume. In some embodiments, the synthetic polymer may be present in an amount in the range of about 0.1% to about 1% weight/volume.

The treatment fluids of the present invention also include at least one crosslinking agent to crosslink at least a portion of the molecules of the polymer to form a crosslinked polymer. As used herein, the term "crosslinking agent" includes any molecule, atom, or ion that is capable of forming one or more crosslinks between molecules of the crosslinkable polymer and/or between two or more atoms in a single molecule of the crosslinkable polymer. The term "crosslink" as used herein refers to a covalent or ionic bond that links one polymer chain to another.

Generally, the crosslinking agent is present in the treatment fluid in an amount sufficient to provide, inter alia, the desired degree of crosslinking between molecules of the crosslinkable polymers. In some embodiments, the crosslinking agent may comprise a delayed crosslinking agent, which may be formulated to form crosslinks between polymer molecules after a certain time or under certain conditions (e.g., temperature, pH, etc.).

The crosslinking agent in the treatment fluids of the present invention may comprise a metal ion that is capable of crosslinking at least two molecules of the crosslinkable polymer. Examples of suitable metal ions include, but are not limited to, zirconium IV ions, titanium ions, and any combination or derivative thereof. These ions may be provided by providing any compound that is capable of producing one or more of these ions; examples of such compounds include, but are not limited to, zirconyl chloride, zirconium sulfate, and titanium isopropoxide with triethanol amine. An example of one suitable commercially available compound capable of providing metal ions is the "CL40™" or "CL-11™" crosslinker, available from Halliburton Energy Services, Inc. of Duncan, Okla. When CL40™ is used in guar-based treatment fluids, the resulting fluids generally exhibit low crosslinking onset temperatures. In contrast, when CL40™ is used in the synthetic treatment fluids of the present invention, the resulting fluids generally exhibit higher crosslinking onset temperatures, in some embodiments delaying the onset of crosslinking until the treatment fluids have been introduced into a subterranean formation.

In some embodiments, the crosslinking agent is present in the treatment fluid in an amount from about 0.1% to about 1.0% by volume. In some embodiments, the crosslinking agent comprises about 0.3% by volume of the fluid. Considerations one may take into account in deciding how much crosslinking agent may be needed include the temperature conditions of a particular application, the composition of the gelling agent used, and/or the pH of the treatment fluid. Other considerations may be evident to one skilled in the art.

The crosslinking of the synthetic polymer is believed to occur through a dual mechanism. First, the carboxylate groups on the polymer interacting with small clusters of hydrous zirconium oxide, such as dimers, tetramers, or higher oligomers to form the initial crosslinks. Such crosslinking is believed to occur at lower pH ranges. In some embodiments, a pH in the range of about 3 to about 5 may be most desirable for maximizing the initial crosslinks formed through the available carboxylate groups of the polymer in the treatment fluid. Generally, as the gelling agent undergoes degradation in the process of a subterranean treatment, the pH of the treatment fluid increases. Such increase in pH may allow for additional crosslinks to form through the available hydroxyl groups of the N-[tris(hydroxymethyl)methyl]acrylamide in the copolymer, thus increasing the stability of the treatment fluid. In some embodiments a pH in the range of about 6 to about 10 may be most desirable for maximizing the second crosslinks formed through the available hydroxyl groups of the polymer groups in the treatment fluids.

Optionally, in some embodiments, the crosslinking agent may also comprise a crosslinking delaying agent to further delay the crosslinking reaction until a desired time and a stabilizing agent operable to provide sufficient stability to allow the crosslinking agent to be uniformly mixed into the polymer solution. Additionally, other additives may be present in a treatment fluid as needed for a chosen application, including but not limited to internal delayed gel breakers, gel stabilizers, and pH-adjusting agents.

In some embodiments, the crosslinking agent may also comprise one or more crosslinking delaying agents to delay the crosslinking reaction relative to when the crosslinking reaction would have occurred in the absence of the crosslinking delaying agent. In some embodiments, this may comprise increasing the temperature at which the onset of crosslinking occurs. Examples of suitable crosslinking delaying agents include, but are not limited to, α-hydroxy acids, such as lactic acid, glycolic acid, and tartaric acid; and polyols, such as glycerin. In some embodiments, glycerin may provide the additional benefit of improving the stability of the gelling agent after it reaches its final, downhole temperature. Generally, these delaying agents may be present in the crosslinking agent in an amount up to about twice the amount on a molar basis of the metal ion present (e.g., zirconium).

The crosslinking agent may also comprise a stabilizing agent operable to provide sufficient stability to allow the crosslinking agent to be uniformly mixed into the polymer solution. Examples of suitable stabilizing agents include, but are not limited to, propionate, acetate, formate, triethanolamine, and triisopropanolamine. In some embodiments, stabilizing agents, such as triisopropanolamine, may improve the shelf life of crosslinking agents with high metal ion (e.g., zirconium) to delaying agent (e.g., lactate) ratios. In particular embodiments, the stabilizing agent may be present in the crosslinking agent in an amount up to about four times the amount on a molar basis of the metal ion present (e.g., zirconium).

In some embodiments, the crosslinking agent may be prepared by mixing two constituent crosslinking agents having different compositions to yield a crosslinking agent that exhibits a certain set of desired properties. For example, in some embodiments, a crosslinking agent with a high zirconium to lactate ratio may be mixed with a base crosslinking agent in varying ratios to adjust the crosslinking onset temperature over a wide range of temperatures. Such a combination may offer the advantage of requiring only two different compositions in product inventory to yield crosslinking agents suitable for a broad range of well conditions.

The treatment fluids of the present invention may also include internal delayed gel breakers such as oxidizing agents, acid generators, or temperature-activated gel breakers. The gel breakers may cause the viscous treatment fluids to revert to thin fluids that can be produced back to the surface after they have been used to place proppant particles in subterranean fractures. Examples of suitable gel breakers include, but are not limited to, manganese dioxide, sodium chlorate, and sodium bromate. In some embodiments, the gel breaker is present in the treatment fluid in an amount of about 0.25 to about 25 lb/1000 gal of fluid. In some embodiments, the gel breaker used may be present in the treatment fluid in an amount in the range of about 0.25 to about 15 lb/1000 gal of fluid.

In some embodiments, the treatment fluids of the present invention may also include a gel stabilizer. Examples of suitable gel stabilizers include, but are not limited to, erythorbic acid, ascorbic acid, isoascorbic acid, and alkali metal salts thereof. In some embodiments, the gel stabilizer may be present in an amount in the range of about 0 to about 5 lb/1000 gal of fluid. In some embodiments, the gel stabilizer is present in an amount of about 2.5 lb/1000 gal of fluid.

In some embodiments, the treatment fluids of the present invention may also include a pH-adjusting agent. Examples of suitable pH-adjusting agents include, but are not limited to, sulfamic acid, hydrochloric acid, sulfuric acid, and sodium bisulfate. In some embodiments, the pH-adjusting agent may be selected so as not to compete with the gelling agent for metal ions provided by the crosslinking agent.

The treatment fluids of the present invention may also include one or more of a variety of well-known additives, such as fluid loss control additives, acids, corrosion inhibitors, catalysts (e.g., those components that may be present in the formation that would act as a catalyst to a breaker), clay stabilizers, biocides, bactericides, gas, surfactants, solubilizers, and the like. In some embodiments, it may be desired to foam a treatment fluid of the present invention using a gas, such as air, nitrogen, or carbon dioxide. Those of ordinary skill in the art, with the benefit of this disclosure, will be able to determine the appropriate additives for a particular application.

The treatment fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In some embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of about 0.5 to about 30 lb/gal of the treatment fluid.

The treatment fluids of the present invention may be prepared by any method suitable for a given application. For example, certain components of the treatment fluid of the present invention may be provided in a pre-blended powder or a dispersion of powder in a nonaqueous liquid, which may be combined with the aqueous base fluid at a subsequent time. They may also be provided in emulsion form, e.g., wherein the discontinuous phase is the copolymer solution. In preparing the treatment fluids of the present invention, the pH of the aqueous base fluid may be adjusted, among other purposes, to facilitate the hydration of the gelling agent. The pH range in which the gelling agent will readily hydrate may depend upon a variety of factors (e.g., the components of the gelling agent, etc.) that will be recognized by one skilled in the art. This adjustment of pH may occur prior to, during, or subsequent to the addition of the gelling agent and/or other components of the treatment fluids of the present invention. After the copolymer and the aqueous base fluid have been combined crosslinking agents and other suitable additives may be added prior to introduction into the well bore. Those of ordinary skill in the art, with the benefit of this disclosure will be able to determine other suitable methods for the preparation of the treatments fluids of the present invention.

The fluids and methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable. The fluids and methods of the present invention may be most useful in fracturing and gravel packing treatments. The fluids and methods of the present invention are suitable in geothermal applications. The fluids and methods of the present invention may also be suitable for use in gas wells, such as those that have low permeability and are relatively deep.

In one embodiment, the present invention provides a treatment fluid comprising: an aqueous base fluid; gelling agent comprising a copolymer comprising N-[tris(hydroxymethyl)methyl]acrylamide, 2-acrylamido-2-methylpropane sulfonic acid, acrylamide, and acrylic acid, or a salt thereof; and a crosslinking agent.

In another embodiment, the present invention provides a method of treating a subterranean formation, comprising: providing a treatment fluid comprising: an aqueous base fluid; a gelling agent comprising a copolymer comprising N-[tris(hydroxymethyl)methyl]acrylamide, 2-acrylamido-2-methylpropanesulfonic acid, acrylamide, or a salt thereof; and a crosslinking agent; and introducing the treatment fluid into a subterranean formation.

In another embodiment, the present invention provides a method of fracturing a subterranean formation, comprising: providing a treatment fluid comprising: an aqueous base fluid; a gelling agent comprising a copolymer comprising N-[tris(hydroxymethyl)methyl]acrylamide, 2-acrylamido-2-methylpropanesulfonic acid, acrylamide, or a salt thereof;

and introducing the treatment fluid into a subterranean formation at a pressure sufficient to create or enhance at least one fracture within the subterranean formation.

To facilitate a better understanding of the present invention, the following examples of specific embodiments are given. In no way should the following examples be read to limit or define the entire scope of the invention.

EXAMPLES

To synthesize the copolymer in accordance with an embodiment of the present invention, 6 g of 2-acrylamido-2-methylpropanesulfonic acid ("AMPS 2404" monomer, available from Lubrizol), 3 g of acrylamide (97%, available from Sigma-Aldrich), 1 g of N-[tris(hydroxymethyl)methyl]acrylamide (93%, available from Sigma-Aldrich), and 10 mg of 2,2'-azobis(2-methylpropionamidine hydrochloride) (available from Wako) were diluted to 100 mL with deionized water in a 120 mL screw cap bottle. The solution was purged with argon for approximately 15 minutes using a needle. The beaker was quickly capped, sealed with electrical tape and placed in a water bath held at 60° C. for approximately 5 hours. The resulting 10% solution was diluted to 1% with deionized water and neutralized to pH 7-8 with 25% sodium hydroxide.

To illustrate thermal stability of the copolymer in accordance with an embodiment of the present invention, 100 mL of the 1% polymer solution was sheared in a Waring blender at approximately half speed. 0.03 g of "FERCHECK" (stabilizer), 0.4 mL of 15% sulfamic acid, and 0.3 mL of CL-40 (Zr-based crosslinker) were added to the solution. Afterwards, the viscosity of the mixture was measured using a Chandler 5550 viscometer fitted with a B5X bob and R1 rotor while the temperature was steadily increased over a 40 minute period to 400° F. During this time, the sample was subjected to a constant shear rate of 40 sec$^{-1}$. The resulting plot of viscosity and temperature versus time is illustrated in FIG. 1.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of treating a subterranean formation, comprising:
providing a treatment fluid comprising: an aqueous base fluid and a reaction product of a gelling agent comprising a copolymer or salt thereof comprising N-[tris(hydroxymethyl)methyl]acrylamide, 2-acrylamido-2-methylpropanesulfonic acid, and acrylamide; and a crosslinking agent; and
introducing the treatment fluid into a subterranean formation, wherein the subterranean formation exhibits a temperature above about 300° F. and below 400° F.

2. The method of claim 1 wherein the gelling agent copolymer further comprises acrylic acid or a salt thereof.

3. The method of claim 1 wherein the crosslinking agent comprises at least one component that comprises a zirconium or titanium metal ion.

4. The method of claim 1 wherein the treatment fluid is foamed.

5. The method of claim 2 wherein 2-acrylamido-2-methylpropanesulfonic acid is present in the copolymer in an amount in the range of about 15 weight % to about 80 weight %, the acrylamide is present therein in an amount in the range of about 10 weight % to about 50 weight %, the N-[tris(hydroxymethyl)methyl]acrylamide is present therein in an amount in the range of about 0.1 weight % to about 10 weight %, and the acrylic acid or a salt thereof is present therein in an amount in the range of about 0 weight % to about 10 weight %.

6. The method of claim 1 wherein the treatment fluid comprises an additive chosen from the group consisting of: crosslinking delaying agent, a stabilizing agent, an internal delayed gel breaker, a gel stabilizer, a pH adjusting agent, a fluid loss control additive, an acid, a corrosion inhibitor, a catalyst, a clay stabilizer, a biocide, a bactericide, a gas, a surfactant, a solubilizer, a proppant particulate, a gravel particulate, and any combination thereof.

7. The method of claim 1 wherein the subterranean formation comprises a geothermal well or a gas well.

8. A method of fracturing a subterranean formation, comprising:
providing a treatment fluid comprising:
an aqueous base fluid and a reaction product of a gelling agent comprising a copolymer or salt thereof comprising N-tris(hydroxymethyl)methyl]acrylamide, 2-acrylamido-2-methylpropanesulfonic acid and acrylamide; and a crosslinking agent; and
introducing the treatment fluid into a subterranean formation at a pressure sufficient to create or enhance at least one fracture within the subterranean formation, wherein the subterranean formation exhibits a temperature above about 300° F. and below 400° F.

9. The method of claim 8 wherein the gelling agent copolymer further comprises acrylic acid or a salt thereof.

10. The method of claim 8 wherein the crosslinking agent comprises at least one component that comprises a zirconium or titanium metal ion.

11. The method of claim 8 wherein the treatment fluid is foamed.

12. The method of claim 8 wherein 2-acrylamido-2-methylpropanesulfonic acid is present in the copolymer in an amount in the range of about 15 weight % to about 80 weight %, the acrylamide is present therein in an amount in the range of about 10 weight % to about 50 weight %, the N-[tris (hydroxymethyl)methyl]acrylamide is present therein in an amount in the range of about 0.1 weight % to about 10 weight %, and the acrylic acid or a salt thereof is present therein in an amount in the range of about 0 weight % to about 10 weight %.

13. The method of claim 8 wherein the treatment fluid comprises an additive chosen from the group consisting of: crosslinking delaying agent, a stabilizing agent, an internal delayed gel breaker, a gel stabilizer, a pH adjusting agent, a fluid loss control additive, an acid, a corrosion inhibitor, a catalyst, a clay stabilizer, a biocide, a bactericide, a gas, a surfactant, a solubilizer, a proppant particulate, a gravel particulate, and any combination thereof.

14. A method comprising:
providing a gravel pack fluid that comprises a base fluid, gravel particulates, and a reaction product of a gelling agent comprising a copolymer or salt thereof comprising N-[tris(hydroxymethyl)methyl]acrylamide, 2-acrylamido-2-methylpropanesulfonic acid and acrylamide; and a crosslinking agent; and
placing the gravel pack fluid in a subterranean formation so as to form a gravel pack neighboring a portion of the subterranean formation, wherein the subterranean formation exhibits a temperature above about 300° F. and below 400° F.

15. The method of claim 14 wherein the gelling agent copolymer further comprises acrylic acid or a salt thereof.

16. The method of claim 14 wherein the crosslinking agent comprises at least one component that comprises a zirconium or titanium metal ion.

17. The method of claim 14 wherein the treatment fluid is foamed.

18. The method of claim 15 wherein 2-acryamido-2-methylpropanesulfonic acid is present in the copolymer in an amount in the range of about 15 weight % to about 80 weight %, the acrylamide is present therein in an amount in the range of about 10 weight % to about 50 weight %, the N-[tris(hydroxymethyl)methyl]acrylamide is present therein in an amount in the range of about 0.1 weight % to about 10 weight %, and the acrylic acid or a salt thereof is present therein in an amount in the range of about 0 weight % to about 10 weight %.

* * * * *